US010649648B2

(12) United States Patent
Lu

(10) Patent No.: US 10,649,648 B2
(45) Date of Patent: May 12, 2020

(54) METHOD AND APPARATUS FOR SCREEN CAPTURE PROCESSING

(71) Applicant: Beijing Xiaomi Mobile Software Co., Ltd., Haidian District, Beijing (CN)

(72) Inventor: Zhenzhou Lu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/917,853

(22) Filed: Mar. 12, 2018

(65) Prior Publication Data

US 2018/0284981 A1 Oct. 4, 2018

(30) Foreign Application Priority Data

Mar. 28, 2017 (CN) .......................... 2017 1 0192878

(51) Int. Cl.
*G06F 17/00* (2019.01)
*G06F 3/0488* (2013.01)
(Continued)

(52) U.S. Cl.
CPC ........ *G06F 3/04883* (2013.01); *G06F 3/0481* (2013.01); *G06F 3/0484* (2013.01); *G06F 3/0488* (2013.01); *G06F 3/04842* (2013.01)

(58) Field of Classification Search
CPC ... G06F 3/04842; G06F 3/017; G06F 3/04883
See application file for complete search history.

(56) References Cited

U.S. PATENT DOCUMENTS

2007/0234212 A1* 10/2007 de Souza .............. G06F 3/0481
715/703
2010/0211893 A1 8/2010 Fanning et al.
(Continued)

FOREIGN PATENT DOCUMENTS

CN 104850327 A 8/2015
CN 105487680 A 4/2016
(Continued)

OTHER PUBLICATIONS

The Extended European Search Report in European application No. 18156424.6, dated Jul. 11, 2018.
(Continued)

*Primary Examiner* — Andrew T McIntosh
(74) *Attorney, Agent, or Firm* — Jun He Law Offices P.C.; James J. Zhu

(57) ABSTRACT

The present disclosure relates to a method and an apparatus for screen capture processing and belongs to the field of computer technology. The method includes determining whether a floating window is contained in a display interface of the terminal when an instruction for capturing the display interface is acquired from a user; generating an initial screenshot by capturing the display interface after determining that the display interface contains the floating window; detecting an operation gesture of the user for the initial screenshot; and removing the floating window from the initial screenshot to generate a target screenshot after detecting that the operation gesture is a preset operation gesture, wherein the target screenshot does not contain an image of the floating window.

9 Claims, 7 Drawing Sheets

(1)

(2)

(51) Int. Cl.
G06F 3/0484 (2013.01)
G06F 3/0481 (2013.01)

(56) References Cited

U.S. PATENT DOCUMENTS

| | | | |
|---|---|---|---|
| 2011/0264709 A1* | 10/2011 | Beardsmore | G06F 9/451 |
| | | | 707/804 |
| 2015/0277571 A1* | 10/2015 | Landau | G06F 3/04842 |
| | | | 715/863 |
| 2015/0286281 A1 | 10/2015 | Fang | |
| 2017/0212670 A1 | 7/2017 | Shimizu | |

FOREIGN PATENT DOCUMENTS

| CN | 105677131 | A | 6/2016 |
| CN | 10602064 | A | 10/2016 |
| CN | 106168872 | A | 11/2016 |
| WO | 2016017420 | A1 | 2/2016 |

OTHER PUBLICATIONS

The First Office Action in Chinese Patent Application No. 201710192878.3, dated Aug. 29, 2019.

* cited by examiner

METHOD AND APPARATUS FOR SCREEN CAPTURE PROCESSING

CROSS REFERENCE TO RELATED APPLICATION

This application is based on and claims priority to Chinese Patent Application No. 201710192878.3, filed on Mar. 28, 2017, which is incorporated herein by reference in its entirety.

TECHNICAL FIELD

The present disclosure relates to the field of computer technology, and more particularly, to a method and an apparatus for screen capture processing.

BACKGROUND

With continuous development of electronic technology, intelligent terminal devices have been more and more widely used in people's daily life and work and brought more and more conveniences for people's life and work. Almost all intelligent terminal devices have a function of Screen Capture. At present, most intelligent terminal devices employ physical combination buttons as the buttons for screen capture. When the combination buttons are pressed at a same time, an image displayed on a current screen can be captured. In this way, however, a problem occurs since it may be difficult for a user to press two buttons simultaneously. There is generally a certain time difference between the instants when the two buttons are pressed. If the time difference is large, a terminal device may firstly respond to the button that is firstly pressed and display a corresponding floating window.

For example, a volume button and a menu button are used as the two combination buttons for screen capture. If the user firstly pressed the volume button and has not yet pressed the menu button within a certain period of time after pressing the volume button, the terminal device may firstly respond to the volume button and display a floating icon corresponding to the volume button. When the menu button is pressed, the terminal device may capture the screen containing the floating window corresponding to the volume button, as shown in FIG. 1. In this case, if the floating window corresponding to the volume button is not desired by the user, the user may need to repeat the operation of screen capture. Thus, the efficiency of screen capture on the terminal device may be decreased.

SUMMARY

The present disclosure provides a method and an apparatus for screen capture processing. The technical solutions are as follows.

According to a first aspect of embodiments in the present disclosure, a method for screen capture processing is provided for use with a terminal. The method may include determining whether a floating window is contained in a display interface of the terminal when an instruction for capturing the display interface is acquired from a user; generating an initial screenshot by capturing the display interface after determining that the display interface contains the floating window; detecting an operation gesture of the user for the initial screenshot; and removing the floating window from the initial screenshot to generate a target screenshot after detecting that the operation gesture is a preset operation gesture, wherein the target screenshot does not contain an image of the floating window.

According to a second aspect of embodiments of the present disclosure, an apparatus for screen capture processing is provided for use with a terminal. The apparatus may include a processor and a memory configured to store instructions executable by the processor. The processor may be configured to determine whether a floating window is contained in a display interface of the terminal when an instruction for capturing the display interface is acquired from a user; generate an initial screenshot by capturing the display interface after determining that the display interface contains the floating window; detect an operation gesture of the user for the initial screenshot; and remove the floating window from the initial screenshot to generate a target screenshot after detecting that the operation gesture is a preset operation gesture, wherein the target screenshot does not contain an image of the floating window.

According to a third aspect of embodiments of the present disclosure, a non-transitory computer-readable storage medium is provided. The storage medium may have instructions stored therein that, when executed by a processor, causes the processor to perform the aforesaid method for screen capture processing for use with a terminal.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Throughout the above figures, explicit embodiments of the present disclosure have been illustrated, which will be described in detail below. The figures and textual description are not intended to limit the scope of the present disclosure in any ways, but rather to teach those skilled in the art, by reference to specific embodiments, the concepts of the present disclosure.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

The terminology used in this disclosure is only for the purpose of describing particular embodiments, but not intended to limit the present disclosure. The singular forms of "a", "an" and "the" as used in the disclosure and the appended claims are also intended to include a plural form, unless clearly indicated otherwise in the context. It is also to be understood that the term "and/or" as used herein refers to and encompasses any or all of the possible combinations of one or more associated listed items.

It should be understood that although various information may be described in the present disclosure with the terms of first, second, third, etc., the information should not be limited by these terms. These terms are used only to distinguish the same type of information from each other. For example, the first information may also be referred to as the second information without departing from the scope of the present disclosure, and similarly, the second information may also be referred to as the first information. Depending on the context, as used herein, the word "if" can be interpreted as "in the case that" or "when" or "in response to determining".

The technical solution provided by the present disclosure is applied to a terminal, which may be, but not limited to, a variety of intelligent terminals capable of performing touch operations through a touch screen, such as a smartphone, a tablet, etc. It will be readily appreciated by those skilled in the art that embodiments of the present disclosure may also be applied to any mobile terminal having a processor and a display output device, and particularly applicable to a terminal having a display output device with an implementation of Multi-Touch technology.

Figure 2:
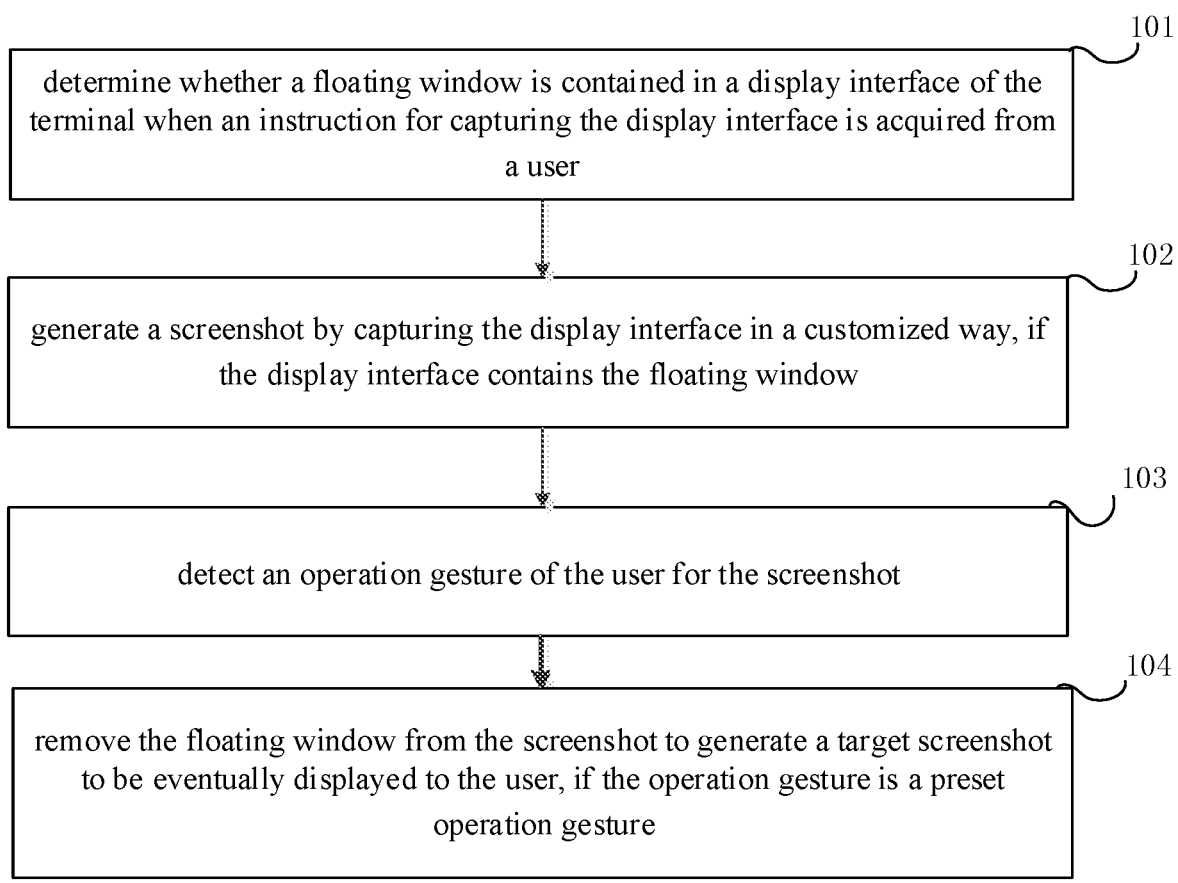
FIG. 2 is a schematic diagram showing a flow chart of a method for screen capture processing according to an exemplary embodiment.

Referring to FIG. 2, a method for screen capture processing according to an exemplary embodiment is illustrated. The method may be applied to a terminal having a touch screen and include the following steps.

In step 101, it may be determined whether a floating window is contained in a display interface of the terminal when an instruction for capturing the display interface is acquired from a user.

In step 102, if the display interface contains the floating window, an initial screenshot may be generated by capturing the display interface in a customized way as described hereinafter. If the display interface does not contain any floating window, a normal screen capture processing may be performed so that a current screenshot may be generated to the user.

In step 103, an operation gesture of the user for the initial screenshot may be detected.

In step 104, if the operation gesture is a preset operation gesture, the floating window may be removed from the initial screenshot and a target screenshot may be generated to be eventually displayed to the user, wherein the target screenshot does not contain an image of the floating window. If the operation gesture is not a preset operation gesture, the initial screenshot may be kept unchanged as the target screenshot.

In summary, according to the technical solution of the present disclosure, it is determined whether a floating window is contained in a display interface of a terminal when an instruction for capturing the display interface is acquired from a user; if the display interface contains the floating window, an initial screenshot is generated by capturing the display interface; then an operation gesture of the user for the initial screenshot is detected; if the operation gesture is a preset operation gesture, the floating window is removed from the initial screenshot and a target screenshot is generated to be eventually displayed to the user. In this way, the floating window that is potentially contained in the initial screenshot can be easily and quickly removed, so that an image containing the content that is really desired by the user can be captured.

The terminal supporting the function of screen capture may usually capture all the content, including a floating window, displayed on the current screen to generate a screenshot containing the floating window, which may affect the result of screen capture. With the above-described scheme as shown in FIG. 2, the floating window appearing in the initial screenshot can be removed by a gesture operation, so as to obtain the target screenshot desired by the user.

Figure 3:
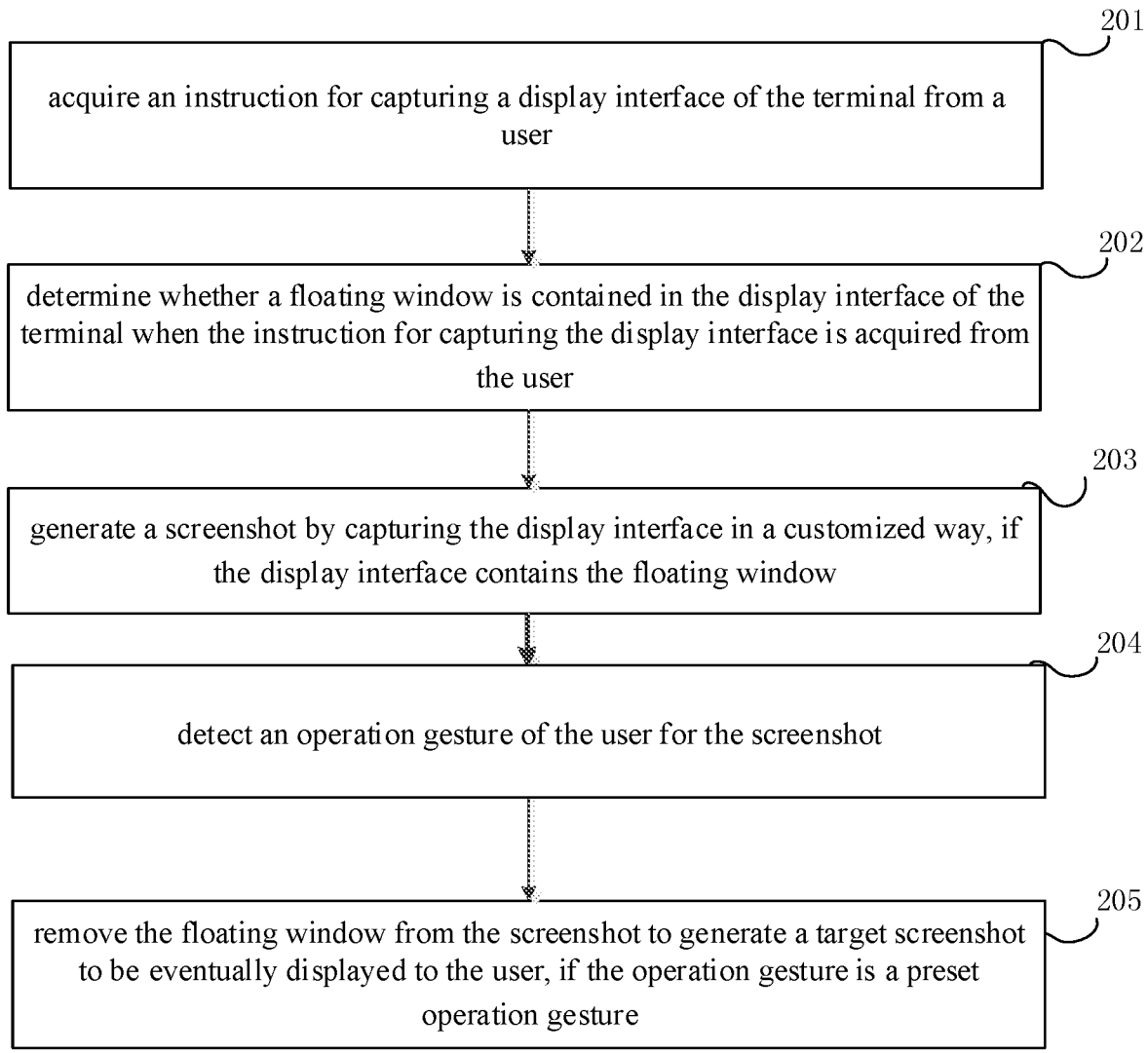
FIG. 3 is a schematic diagram showing a flow chart of a method for screen capture processing according to an exemplary embodiment.

Referring to FIG. 3, a method for screen capture processing according to an exemplary embodiment is illustrated. The method may be applied to a terminal having a touch screen and include the following steps.

In step 201, an instruction for capturing a display interface of the terminal may be acquired from a user.

In an embodiment, the terminal may employ physical combination buttons as the buttons for screen capture. When the combination buttons are pressed at a same time, an image displayed on a current screen can be captured. For example, a volume button and a menu button may be used as the physical combination buttons for screen capture. When the terminal detects that the volume button and the menu button are pressed simultaneously, the instruction for capturing the display interface of the terminal may be acquired from the user.

Alternatively, the terminal may set a shortcut operation gesture or a function icon for the user to make screen capture. The user may send the instruction for screen capture to the terminal by using the shortcut operation gesture or clicking the function icon (e.g. the function icon of "Screen Capture"). The terminal may perform an operation of screen capture after receiving the instruction for screen capture from the user.

In step 202, it may be determined whether a floating window is contained in the display interface of the terminal when the instruction for capturing the display interface is acquired from the user.

In an embodiment, the determination whether a floating window is contained in the display interface of the terminal may be implemented as follows.

Here, the terminal may employ physical combination buttons as the buttons for screen capture. For example, two physical combination buttons may be used as the combination buttons for screen capture. When the two combination buttons for screen capture are pressed at a same time, the terminal may initiate the screen capture. It is to be understood that an ideal state is that the two combination buttons for screen capture are pressed simultaneously. However, in fact, it may be impossible for the user to press two buttons exactly at the same time. There must be a certain time difference between the instants when the two buttons are pressed. If the time difference is too large, the terminal may respond to the button that is first pressed and display a corresponding floating window.

In an implementation of the embodiment, the terminal may detect whether the user has pressed any one of the two combination buttons. When the user has pressed any one of the two combination buttons, a timer may be started. If the button has not yet bounced up and meanwhile the other button of the two combination buttons is also pressed, the timer may be stopped. The duration of time counted by the timer may be regarded as a time interval between the instants when the two combination buttons are pressed.

In another implementation of the embodiment, the terminal may detect whether the user has pressed any one of the two combination buttons, assuming that the one of the two combination buttons that is firstly pressed may be referred to as a first button (which may be any one of the two combination buttons), and the other of the two combination buttons may be referred to as a second button (which may be any one of the two combination buttons). The terminal may acquire instant information about the instant when the first button is pressed by the user (e.g., the instant information may be acquired from the internet or from a predetermined application in the terminal, etc.). If the first button has not yet bounced up and meanwhile the second button is also pressed, the terminal may further acquire instant information about the instant when the second button is pressed by the user. The duration of time that is determined based on the instant information of the two instants may be regarded as a time interval between the instants when the two combination buttons are pressed.

It is to be understood that the time interval between the instants when the two combination buttons for screen capture are pressed may be obtained in any other ways. The specific way to obtain the above described time interval will not be limited in the present disclosure.

Then it may be determined whether the above described time interval is less than or equal to a predetermined threshold.

Generally, if the user wants to capture a floating icon corresponding to any one of the two combination buttons for screen capture (i.e. the floating icon displayed when the pressed button takes effect), the user may usually firstly press the button. After a certain period of time, the pressed button takes effect and the corresponding floating window may be displayed. At this moment, the user may further press the other button of the two combination buttons, so as to capture a desired image.

On the other hand, if the user does not want to capture the floating window corresponding to any one of the two combination buttons for screen capture, the user may try his/her best to press the two combination buttons simultaneously, but there may be still a certain time difference between the instants when the two combination buttons are pressed. If the time difference is little (e.g. less than the response time of individually pressing a single button), the captured image will not contain the floating window corresponding to any one of the two combination buttons. However, if the time difference is large (e.g. larger than the response time of individually pressing a single button), the captured image will contain the floating window that is displayed when the firstly pressed button takes effect.

In the embodiment, a predetermined threshold may be determined in advance. When the above described time interval is less than or equal to the predetermined threshold, it can be considered that the user does not want to capture the floating window corresponding to any one of the two combination buttons for screen capture. When the above described time interval is larger than the predetermined threshold, it can be considered that the user wants to capture the floating window corresponding to the firstly pressed button. It is to be noted that the value of the predetermined threshold can be determined empirically, and the specific value of the predetermined threshold will not be limited in the present disclosure.

When the above described time interval is less than or equal to the predetermined threshold, it may be determined whether the currently displayed image contains the floating window that is displayed when any one of the combination buttons for screen capture is pressed and the pressed button takes effect.

In the embodiment, if the above described time interval is less than or equal to the predetermined threshold, it means that the user does not want to capture the floating window corresponding to any one of the two combination buttons for screen capture. In this case, it may be determined whether the currently displayed image contains the floating window that is displayed when any one of the combination buttons for screen capture is pressed and the pressed button takes effect.

In the embodiment, it may be determined whether the currently displayed image contains the floating window, based on the comparison between the above described time interval and the response time of pressing a button (which is a time interval between the instant when the button is pressed and the instant when the pressed button takes effect). Also, it may be determined whether the currently displayed image contains the floating window by detecting whether any one of the combination buttons has taken effect.

In the above embodiments, it is the long-time interval between the instants when the combination buttons are pressed that makes the terminal respond to the firstly pressed physical button and then causes the appearance of the floating window in the current display interface when the instruction for capturing the display interface of the terminal is acquired from the user. In another application scenario, the terminal having an Android or Apple operating system may notify the user of a newly received message through a notification bar when the new message is received, and thus a floating window for displaying the new message to the user may appear from the top of the screen. If it happens to have a pop-up window for reminding a new message when the terminal acquires the instruction for capturing the display interface of the terminal from the user, a floating window will appear in the current display interface when performing the screen capture. In this scenario, it may be determined whether the display interface contains the floating window by the way of reading data parameters of the display interface, determining whether the data parameters include data of the floating window, and determining that the initial screenshot contains the floating window if the data parameters include the data of the floating window. Alternatively, it may be determined whether the currently displayed image contains the floating window by conducting an image analysis to the currently displayed image. It is to be understood that it may be determined whether the currently displayed image contains the floating window in any other ways. The specific way to determine whether the currently displayed image contains the floating window will not be limited in the present disclosure.

In an embodiment, if the display interface contains the floating window, the step 203 may be executed; if the display interface does not contain the floating window, all the content displayed in the current screen may be captured directly to generate the screenshot and the screen capture process ends.

In step 203, if the display interface contains the floating window, an initial screenshot may be generated by capturing the display interface in a customized way.

In an embodiment, the generation of the initial screenshot by capturing the display interface in the customized way may be implemented as follows.

A first screenshot may be generated by capturing the display interface of the terminal with the floating window; a second screenshot may be generated by capturing the display interface of the terminal without the floating window; and the initial screenshot may be generated by superimposing the first screenshot on the second screenshot, wherein the first screenshot is in an upper layer of the initial screenshot and the second screenshot is in a lower layer of the initial screenshot.

In the embodiment, the generation of the first screenshot by capturing the display interface of the terminal with the floating window may include reading or obtaining data parameters of the current screen display of the terminal to generate the first screenshot. The generation of the second screenshot by capturing the display interface of the terminal without the floating window may include reading or obtaining the data parameters of the current screen display of the terminal and removing data parameters of the floating window displayed in the screen to generate the second screenshot.

Figure 1:
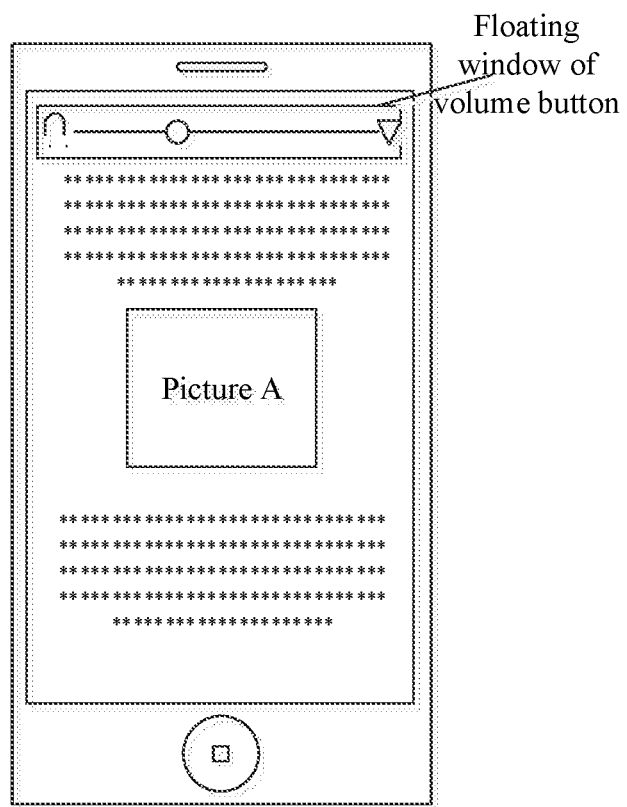
FIG. 1 is a schematic diagram of a captured image containing a floating window corresponding to a volume button.
Figure 4:
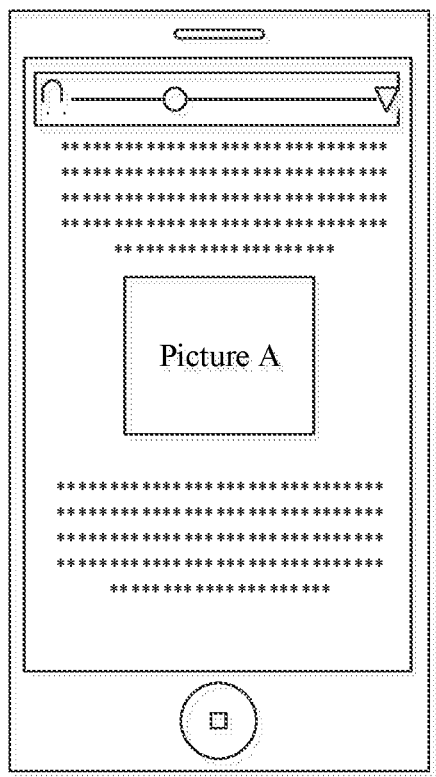
FIG. 4 is a schematic diagram of a captured image in a screen capture process according to an exemplary embodiment.
Figure 4:
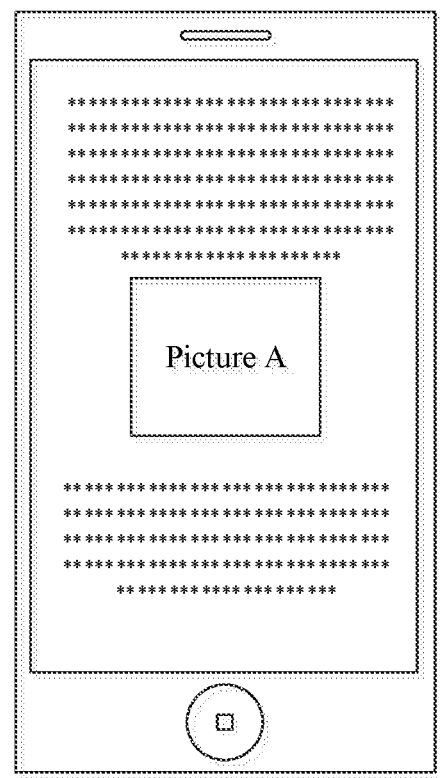

Referring to FIG. 4, when the terminal acquires the instruction for screen capture, the display interface of the terminal is the display interface shown in FIG. 1. According to the technical solution of the present disclosure, the terminal may read or obtain the data parameters of the current screen display of the terminal with the floating window to generate the first screenshot, as shown in FIG. 4(1); meanwhile, the terminal may remove the floating window displayed in the current display interface of the terminal and capture an original image under the floating window to generate the second screenshot, namely capture the display interface of the terminal without the floating window, as shown in FIG. 4(2). Then, the screenshot to be displayed to the user may be generated by superimposing the first screenshot as shown in FIG. 4(1) on the second screenshot as shown in FIG. 4(2), as shown in FIG. 4(1), wherein the first screenshot is in an upper layer of the initial screenshot and the second screenshot is in a lower layer of the initial screenshot.

In step 204, an operation gesture of the user for the initial screenshot may be detected.

In an embodiment, when the current display interface of the terminal to be captured by the user contains the floating window, the floating window existing in the initial screenshot may be removed by a preset operation gesture. For example, the preset operation gesture may be an operation gesture of sliding upward along the screen. The terminal may detect the operation gesture of the user for the initial screenshot displayed in the touch screen. If it is detected that the operation gesture is the preset operation gesture (e.g. the operation gesture of sliding upward along the screen), the step 205 may be executed.

In step 205, if the operation gesture is the preset operation gesture, the floating window may be removed from the initial screenshot and a target screenshot may be generated to be eventually displayed to the user.

In an embodiment, the generation of the target screenshot to be eventually displayed to the user may include removing the first screenshot in the upper layer of the initial screenshot and displaying the second screenshot in the lower layer of the initial screenshot.

For example, the initial screenshot as shown in FIG. 4(1) is obtained in the screen capture process of the terminal, and the initial screenshot contains the floating window that is undesired by the user. In this case, the user may employ a gesture of sliding upward along the screen to remove the first screenshot (as shown in FIG. 4(1)) displayed in the upper layer of the initial screenshot, and get the second screenshot (as shown in FIG. 4(2)) without the floating window as the target screenshot. The user may perform operations such as saving, editing, sharing, etc. to the target screenshot.

In summary, according to the technical solution of the present disclosure, it is determined whether a floating window is contained in a display interface of a terminal when an instruction for capturing the display interface is acquired from a user; if the display interface contains the floating window, an initial screenshot is generated by capturing the display interface in a customized way; then an operation gesture of the user for the initial screenshot is detected; if the operation gesture is a preset operation gesture, the floating window is removed from the initial screenshot and a target screenshot is generated to be eventually displayed to the user. In this way, the floating window that is potentially contained in the initial screenshot can be easily and quickly removed, so that an image containing the content that is really desired by the user can be captured.

The following apparatus embodiments of the present disclosure may be used to implement the method embodiments of the present disclosure. For the details that are not disclosed in the apparatus embodiments, reference can be made to the method embodiments.

Figure 5:
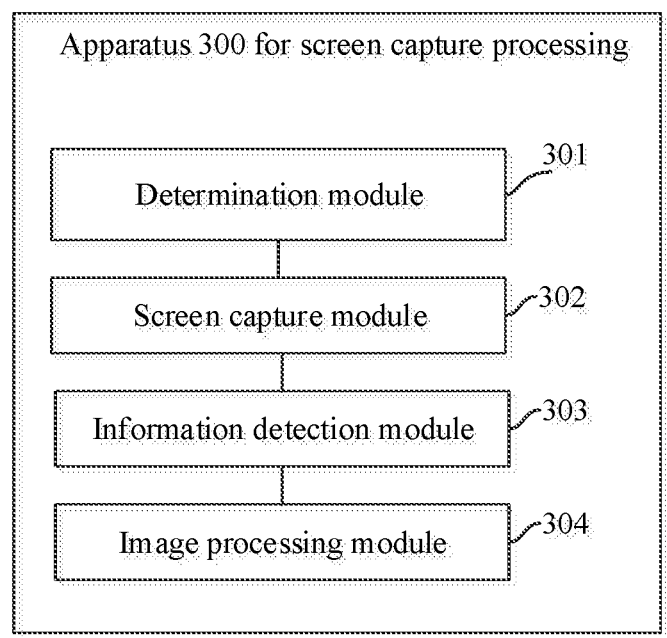
FIG. 5 is a block diagram of an apparatus for screen capture processing according to an exemplary embodiment.

FIG. 5 is a block diagram of an apparatus 300 for screen capture processing according to an exemplary embodiment. The apparatus 300 for screen capture processing may be implemented as a part or entirety of a terminal by software, hardware, or a combination of both, and the terminal may be an electronic display device such as a mobile phone or a tablet computer with a touch screen. The apparatus 300 for screen capture processing may include the following modules.

A determination module 301 may be configured to determine whether a floating window is contained in a display interface of the terminal when an instruction for capturing the display interface is acquired from a user.

A screen capture module 302 may be configured to generate an initial screenshot by capturing the display interface in a customized way if the display interface contains the floating window.

An information detection module 303 may be configured to detect an operation gesture of the user for the initial screenshot.

An image processing module 304 may be configured to remove the floating window from the initial screenshot and generate a target screenshot to be eventually displayed to the user, if the operation gesture is a preset operation gesture, wherein the target screenshot does not contain an image of the floating window.

Figure 6:
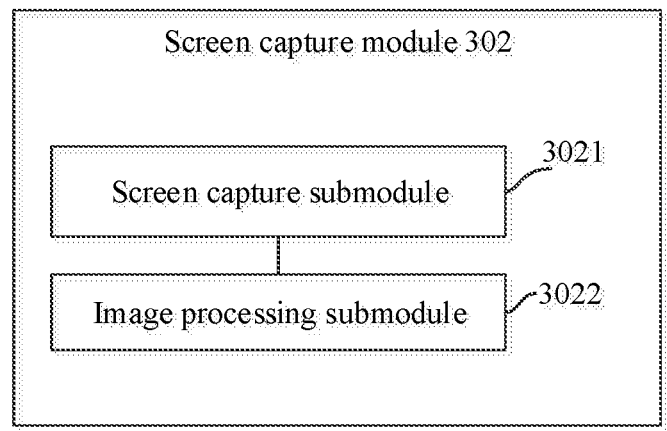
FIG. 6 is a block diagram of an apparatus for screen capture processing according to an exemplary embodiment.

Referring to FIG. 6, the screen capture module 302 as shown in FIG. 5 may include a screen capture submodule 3021 configured to generate a first screenshot by capturing the display interface of the terminal with the floating window, and generate a second screenshot by capturing the display interface of the terminal without the floating window; and an image processing submodule 3022 configured to generate the initial screenshot by superimposing the first screenshot on the second screenshot, wherein the first screenshot is in an upper layer of the initial screenshot and the second screenshot is in a lower layer of the initial screenshot.

In an embodiment, the image processing module 304 as shown in FIG. 5 may be configured to remove the first screenshot in the upper layer of the initial screenshot and display the second screenshot in the lower layer of the initial screenshot.

In an embodiment, the preset operation gesture may be an operation gesture of sliding upward along the screen.

Figure 7:
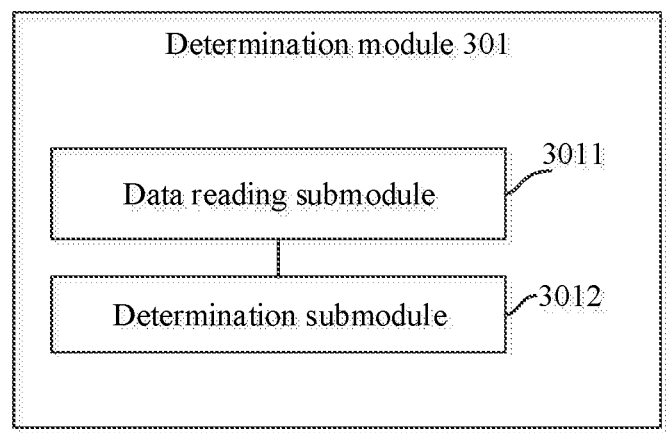
FIG. 7 is a block diagram of an apparatus for screen capture processing according to an exemplary embodiment.

Referring to FIG. 7, the determination module 301 as shown in FIG. 6 may include a data reading or obtaining submodule 3011 configured to read or obtain data parameters of the display interface of the terminal and determine whether the data parameters include data of the floating window; and a determination submodule 3012 configured to determine that the initial screenshot contains the floating window if the data parameters include the data of the floating window.

With respect to the apparatuses in the above embodiments, the specific mode in which each module performs operations has been described in detail in the related method embodiments, and the description thereof will not be elaborated herein.

In summary, according to the technical solution of the present disclosure, it is determined whether a floating window is contained in a display interface of a terminal when an instruction for capturing the display interface is acquired from a user; if the display interface contains the floating window, an initial screenshot is generated by capturing the display interface in a customized way; then an operation gesture of the user for the initial screenshot is detected; if the operation gesture is a preset operation gesture, the floating window is removed from the initial screenshot and a target screenshot is generated to be eventually displayed to the user. In this way, the floating window that is potentially contained in the initial screenshot can be easily and quickly removed, so that an image containing the content that is really desired by the user can be captured.

Figure 8:
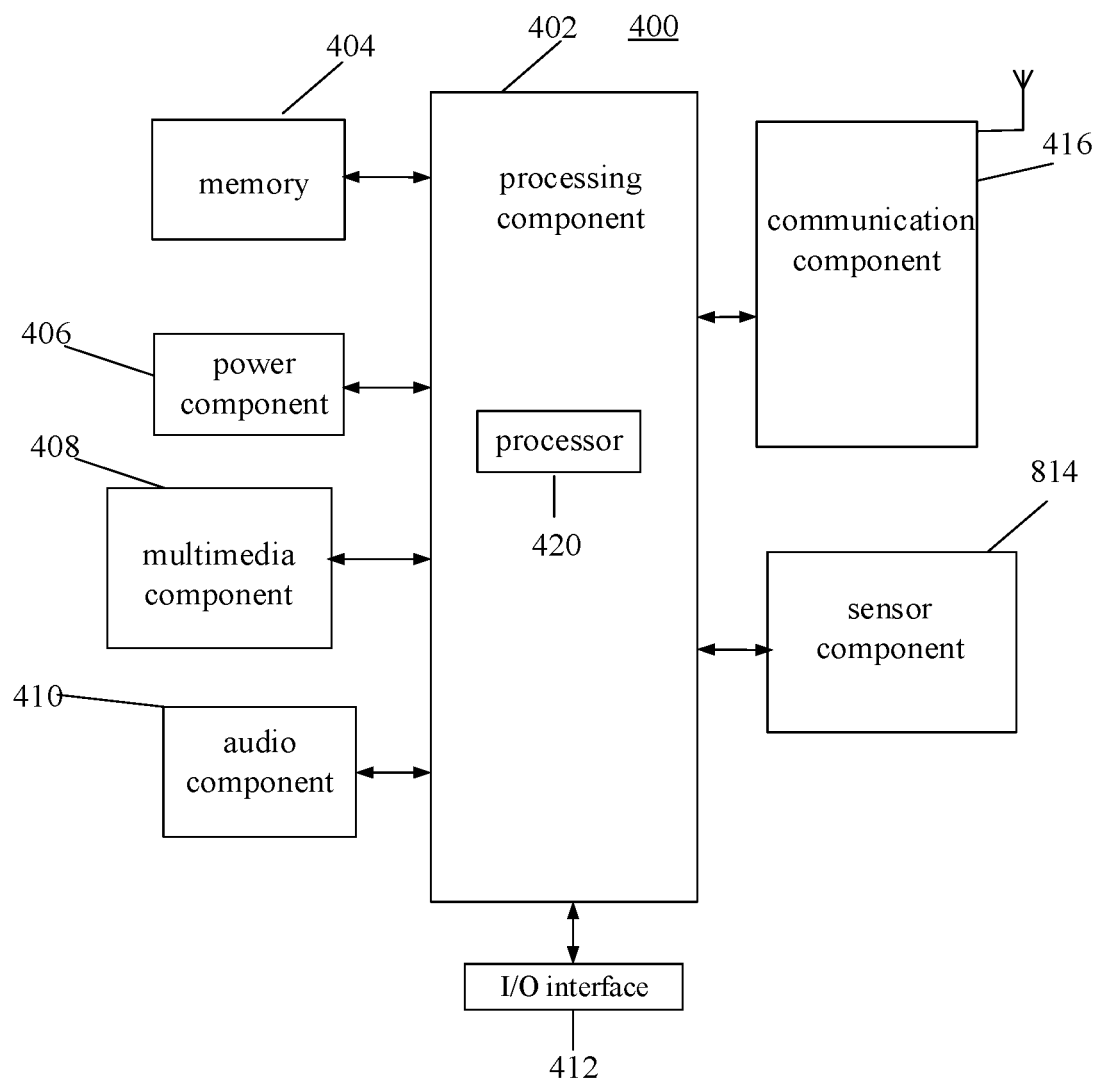
FIG. 8 is a block diagram of a device for screen capture processing according to an exemplary embodiment.

Referring to FIG. 8, it shows a block diagram of a device 400 for screen capture processing according to an exemplary embodiment. For example, the device 400 may be an electronic display device having a touch screen, such as a mobile phone, a tablet computer or the like.

Referring to FIG. 8, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support operations of the device 400. Examples of such data may include instructions for any applications or methods operated on the device 400, contact data, phonebook data, messages, pictures, videos, etc. The memory 404 may be implemented using any type of volatile or nonvolatile storages, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action. In some embodiments, the multimedia component 408 includes a front camera and/or a rear camera. The front camera and/or the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a Complementary Metal Oxide Semiconductor (CMOS) or Charge-coupled Device (CCD) image sensor, for use in imaging applications. In some embodiments, the sensor component 414 may also include an accelerometer sensor, a gyroscope sensor, a magnetic sensor, a distance sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G or 3G or a combination thereof. In an exemplary embodiment, the communication component 416 receives a broadcast signal or broadcast associated information from an external broadcast management system via a broadcast channel. In an exemplary embodiment, the communication component 416 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the device 400 may be implemented with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In exemplary embodiments, there is also provided a non-transitory computer-readable storage medium including instructions, such as the memory 404 including instructions or computer programs executable by the processor 420 in the device 400 to perform the above-described methods for screen capture processing. For example, the non-transitory computer-readable storage medium may be a Ramdom Only Memory (ROM), a Ramdom Access Memory (RAM), a Compact Disc Read-Only Memory (CD-ROM), a magnetic tape, a floppy disc, an optical data storage device, and the like.

A non-transitory computer-readable storage medium is provided. The computer-readable medium may include instructions that, when executed by the processor of the device 400, enable the device 400 to perform the above-described methods for screen capture processing.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for screen capture processing for use with a terminal, comprising:
   determining that two buttons of the terminal are pressed simultaneously to capture a display interface of the terminal, the two buttons including a firstly pressed button;
   determining a time interval between time instants of pressing the two buttons;
   comparing the time interval with a response time of the firstly pressed button, wherein the response time is a time lag between a time instant when a button is pressed and a time instant when the pressed button takes effect;
   in response to that the time interval is larger than the response time of the firstly pressed button, determining that a floating window is contained in the captured display interface of the terminal;
   generating an initial screenshot by capturing the display interface after determining that the display interface contains the floating window, wherein the generating the initial screenshot by capturing the display interface comprises:
      generating a first screenshot by capturing the display interface of the terminal with the floating window, and generating a second screenshot by capturing the display interface of the terminal without the floating window; and
      generating the initial screenshot by superimposing the first screenshot on the second screenshot, wherein the first screenshot is in an upper layer of the initial screenshot and the second screenshot is in a lower layer of the initial screenshot;
   detecting an operation gesture of the user for the initial screenshot; and
   removing the floating window from the initial screenshot to generate a target screenshot after detecting that the operation gesture is a preset operation gesture, wherein the target screenshot does not contain an image of the floating window, wherein the removing the floating window from the initial screenshot to generate the target screenshot comprises:
      removing the first screenshot in the upper layer of the initial screenshot and displaying the second screenshot in the lower layer of the initial screenshot.

2. The method of claim 1, wherein the preset operation gesture is an operation gesture of sliding upward along a touch screen of the terminal.

3. The method of claim 1, wherein the determining whether the floating window is contained in the display interface comprises:
   obtaining data parameters of the display interface of the terminal and determining whether the data parameters include data of the floating window; and
   determining that the display interface contains the floating window if the data parameters include the data of the floating window.

4. An apparatus for screen capture processing for use with a terminal, comprising:
   a processor; and
   a memory configured to store instructions executable by the processor,
   wherein the processor is configured to:
   determine that two buttons of the terminal are pressed simultaneously to capture a display interface of the terminal, the two buttons including a firstly pressed button;
   determine a time interval between time instants of pressing the two buttons;
   compare the time interval with a response time of the firstly pressed button, wherein the response time is a time lag between a time instant when a button is pressed and a time instant when the pressed button takes effect;
   in response to that the time interval is larger than the response time of the firstly pressed button, determine that a floating window is contained in the captured display interface of the terminal;
   generate an initial screenshot by capturing the display interface after determining that the display interface contains the floating window;
   detect an operation gesture of the user for the initial screenshot; and
   remove the floating window from the initial screenshot to generate a target screenshot after detecting that the operation gesture is a preset operation gesture, wherein the target screenshot does not contain an image of the floating window;
   wherein the processor is further configured to:
   generate a first screenshot by capturing the display interface of the terminal with the floating window, and generate a second screenshot by capturing the display interface of the terminal without the floating window; and generate the initial screenshot by superimposing the first screenshot on the second screenshot, wherein the first screenshot is in an upper layer of the initial screenshot and the second screenshot is in a lower layer of the initial screenshot, wherein the processor is further configured to remove the first screenshot in the upper layer of the initial screenshot and display the second screenshot in the lower layer of the initial screenshot.

5. The apparatus of claim 4, wherein the preset operation gesture is an operation gesture of sliding upward along a touch screen of the terminal.

6. The apparatus of claim 4, wherein the processor is further configured to:

obtain data parameters of the display interface of the terminal and determine whether the data parameters include data of the floating window; and determine that the display interface contains the floating window if the data parameters include the data of the floating window.

7. A non-transitory computer-readable storage medium having stored therein instructions that, when executed by a processor, causes the processor to perform a method for screen capture processing for use with a terminal, the method comprising:

determining that two buttons of the terminal are pressed simultaneously to capture a display interface of the terminal, the two buttons including a firstly pressed button;

determining a time interval between time instants of pressing the two buttons;

comparing the time interval with a response time of the firstly pressed button, wherein the response time is a time lag between a time instant when a button is pressed and a time instant when the pressed button takes effect;

in response to that the time interval is larger than the response time of the firstly pressed button, determining that a floating window is contained in the captured display interface of the terminal when an instruction for capturing the display interface is acquired from a user;

generating an initial screenshot by capturing the display interface after determining that the display interface contains the floating window, wherein the generating the initial screenshot by capturing the display interface comprises:

generating a first screenshot by capturing the display interface of the terminal with the floating window, and generating a second screenshot by capturing the display interface of the terminal without the floating window; and generating the initial screenshot by superimposing the first screenshot on the second screenshot, wherein the first screenshot is in an upper layer of the initial screenshot and the second screenshot is in a lower layer of the initial screenshot;

detecting an operation gesture of the user for the initial screenshot; and removing the floating window from the initial screenshot to generate a target screenshot after detecting that the operation gesture is a preset operation gesture, wherein the target screenshot does not contain an image of the floating window, wherein the removing the floating window from the initial screenshot to generate the target screenshot comprises:

removing the first screenshot in the upper layer of the initial screenshot and displaying the second screenshot in the lower layer of the initial screenshot.

8. The non-transitory computer-readable storage medium of claim 7, wherein the preset operation gesture is an operation gesture of sliding upward along a touch screen of the terminal.

9. The non-transitory computer-readable storage medium of claim 7, wherein the determining whether the floating window is contained in the display interface comprises:

obtaining data parameters of the display interface of the terminal and determining whether the data parameters include data of the floating window; and determining that the display interface contains the floating window if the data parameters include the data of the floating window.

* * * * *